July 27, 1937.    D. D. KNOWLES    2,088,477
TEMPERATURE CONTROL SYSTEM
Filed Oct. 3, 1935
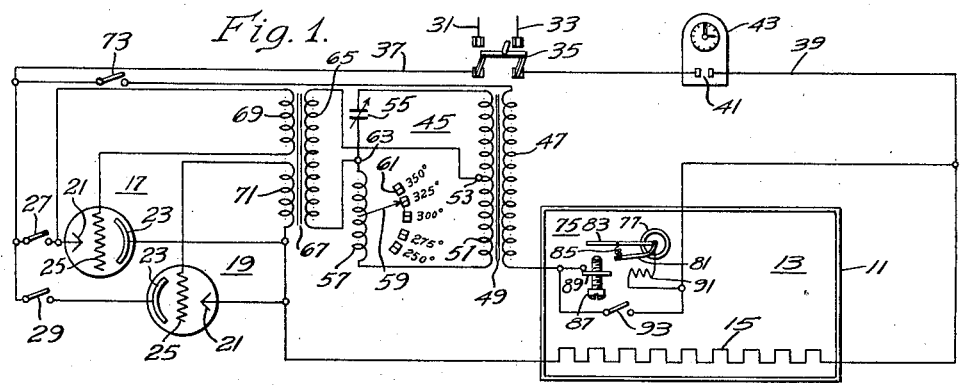
WITNESSES:
C. J. Weller.
Jm. C. Groome
INVENTOR
Dewey D. Knowles.
BY
W. R. Coley
ATTORNEY Patented July 27, 1937

2,088,477

UNITED STATES PATENT OFFICE 2,088,477

TEMPERATURE CONTROL SYSTEM

Dewey D. Knowles, Wilkinsburg, Pa., assignor to Westinghouse Electric & Manufacturing Company, East Pittsburgh, Pa., a corporation of Pennsylvania Application October 3, 1935, Serial No. 43,362

18 Claims. (Cl. 219—20)

My invention relates to temperature control systems and particularly to temperature control systems used with range ovens.

This application is a continuation in part of my copending application Serial No. 757,559, filed December 14, 1934.

An object of my invention is to provide a relatively simply and efficient control system for controlling the temperature in the oven of a range.

Another object of my invention is to provide a temperature control system to permit of obtaining any one of a plurality of different temperature cycles in a range oven.

Another object of my invention is to provide a simple system of temperature control enabling an operator to obtain a short-time peak temperature and then a lower maintained temperature in a cooking chamber.

Other objects of my invention will either be pointed out hereinafter in the course of the following description of several modifications of devices and systems embodying my invention or will be apparent without further description.

In practicing my invention, I provide in combination with a cooking chamber and a source of heat therefor, apparatus for controlling the source of heat, comprising electric discharge devices, a phase shifting device electrically connected to the discharge devices to control their conductivity and thermally-actuated switches controlling the phase shifting device. I provide further for enabling or disabling the thermally-actuated switches to permit an operator to obtain at will any one of a different number of temperature cycles in a cooking chamber.

In the single sheet of drawings,

Figure 1 is a diagram of connections embodying my improved control system,

Fig. 2 is a diagram of connections showing a modification of the system illustrated in Fig. 1.

Fig. 3 is a diagram of connections showing a still further modification of the system embodying my invention, Fig. 4 is a top plan view of a part of one form of thermal switch utilized by me, Fig. 5 is a view in side elevation of the device shown in Fig. 4, and Fig. 6 is a curve showing the temperature cycles obtainable with the respective modifications of the system embodying my invention.

In the preparation of certain kinds of food, particularly in cooking roasts of meat, it is highly desirable to first subject the meat to a relatively high or peak temperature in order to properly sear the outside of the roast of meat, after which it should be subjected to a lower sustained or maintained temperature in order to properly cook the same. The searing of the meat by the initial high peak temperature is to act upon the surface of the meat in such manner as to seal in the juices and it has been found that this peak temperature need be continued for a relatively short time only. The subjection of the roast to the lower maintained temperature may continue for a much longer time and will, of course, depend upon the weight of the meat, its character and the desired degree to which it shall be cooked, that is, whether it shall be rare or well done.

Any system of control which may properly be called "automatic" should be of a character to recognize the weight of the roast as well as the quantity of heat which is introduced into a cooking chamber in which the roast may be located. It is obvious that if, say, a five pound roast of meat is to be prepared, the outside thereof will reach the desired peak temperature in a much shorter time than would be the case if, say, a ten pound or fifteen pound roast were to be subjected to the same source of heat in the same cooking chamber. A thermostatic switch located in the cooking chamber or affected by the temperature of a selected part of the cooking chamber, so that it will follow the temperature variations either in the cooking chamber or substantially those of the material being cooked, will automatically recognize the differences in length of time, since, as has just been set forth, it will require a longer time for the food to reach a predetermined peak temperature when a larger roast is located in a cooking chamber than would be the case if a much smaller roast were to be located therein.

Referring now to Fig. 1 of the drawing, I have there illustrated, generally only, a range oven indicated by numeral 11 and enclosing a cooking chamber 13. Since the system embodying my invention is applicable to all kinds of range ovens irrespective of the details of construction of the walls thereof, the size of the cooking chamber and the source of heat, I have illustrated the oven, as stated above, schematically only. I have further illustrated in Fig. 1 of the drawing the source of heat as comprising an electric resistor 15 and here again the showing is schematic only and it is to be understood that any kind of electric heating element may be utilized, located either in the cooking chamber or properly operatively associated therewith, and the capacity thereof, particularly as to the generation of heat thereby, is to be such that cooking of food located in the oven chamber 13 will be effected within a reasonable time, irrespective of the weight or general character of the food which is to be cooked in the range.

Means for controlling the energization of heating element 15 is constituted by a pair of electric discharge devices or tubes 17 and 19. Each of these tubes is provided with a cathode 21, an anode 23 and a control grid 25, all in a manner now well known in the art. As illustrative of the kind of electric discharge device which I may use, I may mention that devices 17 and 19 may be grid-glow tubes, although it is within the scope of my invention to use other types of discharge devices or tubes which are provided with control grids and which are effective for the same general purpose. It may be noted that the two electric discharge devices 17 and 19 are connected in parallel and in opposition to each other in order that full wave passage of an alternating electric current may be obtained. That is, when tube 17 is fully conductive, one half wave of current, for instance the positive half wave, will traverse the tube and, therefore, the heating element 15, while when the tube 19 is fully conductive, the complete half wave having a negative sign or potential will traverse the second tube and, therefore, the heating element 15.

I have illustrated two manually operable switches 27 and 29 connected in series circuit with the respective tubes 17 and 19, but it is within the scope of my invention to combine these two manually actuable switches into a single switch of any desired kind, such as a double pole knife switch or a double pole rotatable snap switch.

The source of supply of electric energy controlled by the electric discharge devices 17 and 19 may comprise suitable conductors 31 and 33 which are indicative of any suitable source of supply of electric energy, either two-wire or three-wire, and at any desired operating voltage. A switch 35 which may be manually operable, permits of energizing or deenergizing the conductors 37 and 39, to which the electric discharge devices 17 and 19 and the heating element 15 are connected in series circuit in a manner well known in the art.

As it may be desirable to use a time control to cause energization and deenergization of the system, I provide a time switch 41 operatively associated with a suitable clock 43 which may be of a type now well known in the art and which may be adjusted to cause closing of the switch 41 at a predetermined time and which may further be adjusted to cause opening of said switch contacts at some other future predetermined time.

Means for controlling the conductivity of the two electric discharge devices 17 and 19 includes a phase-shifting device indicated by the numeral 45. The phase-shifting device includes a primary coil 47 of a first transformer including, in addition to the primary winding, a core 49 and a secondary coil 51. The secondary coil 51 is provided in addition to the terminals with a midpoint tap 53. One terminal of secondary winding 51 is connected to one terminal of a condenser 55 which may be adjustable, if desired. The other terminal of coil 51 is connected to one terminal of a reactor 57 which may be made adjustable and which may have associated therewith a pointer 59 moving over the scale 61, which scale 61 is preferably marked in degrees of temperature. The other terminal of condenser 55 and the other terminal of reactor 57 are connected together as at 63. The mid-coil tap 53 is connected to one terminal of a primary winding 65 of a second transformer, the other terminal of coil 65 being connected to junction 63 whereby a Wheatstone bridge connection is obtained. The second transformer includes, in addition to the primary winding 65, an iron core 67 and two secondary coils 69 and 71. One terminal of coil 69 is connected to cathode 21 of the electric discharge device 17, while the other terminal of secondary coil 69 is electrically connected to grid 25. One terminal of secondary coil 71 is electrically connected to grid 25 of tube 19, while the other terminal of coil 71 is electrically connected to cathode 21 of tube 19.

The energization of primary coil 47 of the first transformer is controlled by a manually actuable switch 73 and by a thermal switch 75 which may be of any suitable or desired type, but is here shown as including a bimetallic spiral 77 located either in cooking chamber 13 or in heat-receiving relation relatively thereto. One end of bimetal spiral 77 is fixed as is indicated schematically in Fig. 5 of the drawing by numeral 79, to any suitable or desired stationary member, while the other end thereof has fixedly secured thereto an arm 81, which latter is adapted to be moved in a peripheral path when the bimetallic spiral 77 is subjected to a variable or changing temperature. A second arm 83 is also actuated in a peripheral path, and has one end thereof pivotally mounted in a suitable manner on either the inner end of arm 81 or on the movable end of the bimetallic spiral 77, arm 83 being yieldingly connected with arm 81 as by a spring 85. The reason for the use of an actuating arm 81 having a contact arm 83 yieldingly connected therewith is that the bimetallic spiral 77 will be subjected to relatively large variations of temperature and it is desired to reduce the strain thereon to a relatively small and, therefore, safe value.

Contact arm 83 is adapted to engage with and be disengaged from an adjustable contact member illustrated in Fig. 4 of the drawing, as including a manually adjustable contact screw 87 mounted in an electrically conducting fixed member 89.

The thermal switch 75 includes further a small heating element 91 connected in series circuit relation with contact arm 83 and contact screw 87 to be controlled thereby. The object of the auxiliary heating element 91 is to provide a lock-in means for the thermal switch 75, so that switch 75 once having been thermally actuated to its closed position at a predetermined peak temperature, will remain in its closed position irrespective of predetermined reductions in the temperature to which it is subjected. It is to be noted that thermal switch 75 is initially open and that where a peak temperature on the order of 500 to 550° is desired, such as is usually required to properly sear the outside of a roast, thermal switch 75 will remain open until the temperature thereof has reached approximately 525° F. or any other adjusted value.

In order to enable and disable the thermal switch 75, I provide a manually actuable switch 93 connected in parallel circuit relation relatively to thermal switch 75 and while I have shown it as located in the cooking chamber 13, it is obvious that it may be located at any desirable or suitable place on or in the range and it has been shown as indicated in Fig. 1 of the drawing, merely for the sake of simplicity.

Let it be assumed that an operator desires to start the cooking operation immediately, so that switches 27, 29, 35, 41 and 73 have all been moved to their closed positions, and that, as was just hereinbefore explained, thermal switch 75 is in its open position substantially as shown in Fig. 1 of the drawing. Since the phase-shifting device 45 is deenergized, it being understood that switch 93 is in its open position, the respective electric discharge devices 17 and 19 are fully conductive, in a manner well known in the art, since no blocking voltage is applied to the grids 25 thereof. The temperature in the cooking chamber 13 will, therefore, increase and at a peak temperature determined by the adjustment of thermal switch 75, this switch will close the circuit controlled thereby, whereby the phase-shifting device 45 will be energized.

Let it be assumed that reactor 57 has been adjusted to obtain a temperature of, say 325°. The action of the phase-shifting device 45 will then be such as to reduce the conductivity of the respective electric discharge devices from that originally existing when they were each fully conductive over one-half wave of a complete cycle, so that they are now conductive over only a portion of each half wave of the alternating electric current, all in a manner now well known in the art.

The operation, or more particularly the temperature cycle, is shown generally in Fig. 6 of the drawing where curve 95 indicates the rise in temperature in the cooking chamber or of the thermal switch 75 to a predetermined peak temperature which, as has already been stated, may be on the order of 525°, at which time thermal switch 75 closes its contacts to energize the primary coil 47 of the phase-shifting device 45 with the action just above described to reduce the average current value per unit of time to some predetermined lower value. The temperature will now drop and will follow in general the broken line curve 97 and will finally become substantially constant, as is indicated by the relatively flat portion 121 of the curve. As has already been hereinbefore stated, the condenser 55 or the reactor 57 may be made adjustable so that it is possible to reduce the average or root-mean-square value per unit of time of the current traversing the electric discharge devices 17 and 19 and the heating resistor 15 from a predetermined maximum value when both electric discharge devices are fully conductive to a lower average or root-mean-square value, to thereby obtain a short time peak temperature and then a lower sustained or maintained temperature value in the cooking chamber.

Let it be assumed that switches 27, 29, 35, 41 and 73 have been closed and that an operator desires to obtain the lower maintained temperature as may be useful in the preparation of other kinds of foods where a substantially constant temperature is desired. The operator merely closes switch 93, which immediately energizes the phase-shifting device, and the temperature in the cooking chamber rises to a value dependent upon the adjustment of the phase-shifting device, the electric discharge tubes being initially partly conducting only, so that no peak temperature effect will be obtained, but only a gradual increase to, and then a continuance of the maintained temperature, the value of which is determined by the adjustment, say, of reactor 57.

Referring now to the auxiliary heating element 91, its use will be apparent since, as was hereinbefore stated, it provides an auxiliary source of heat to offset the reduction in the temperature of bimetallic spiral 77 when the temperature thereof drops from the initial short time peak value to a lower value. In other words, auxiliary heating element 91 provides a lock-in feature or means associated with thermal switch 75 to insure that it will remain in its closed position irrespective of temperature drop in the cooking chamber and this thermal switch may therefore be called a single cycle thermal switch.

Referring now to Fig. 2 of the drawing, I have there illustrated a modification of the system shown in Fig. 1 of the drawing, the main difference being that the electric discharge devices 17 and 19 may have a greatly reduced current-carrying capacity. Whereas, in the system shown in Fig. 1 of the drawing, it was necessary that their current-carrying capacity be substantially that of heating resistor 15, which may be on the order of up to 20 amperes, the electric discharge tubes 17 and 19 in the system shown in Fig. 2 of the drawing need carry only a relatively small current, on the order of one-half to one ampere. The energization of the heating resistor 15 is controlled by a contactor 99 which includes an actuating coil 101, and a core member 103 energized thereby and moving a contact bridging member 105 which is adapted to engage with and be disengaged from a pair of fixed contact members 107. While I have illustrated a specific embodiment of a contactor, I do not desire to be limited thereto, since the showing is intended to cover all similar devices effective for the purpose of providing an electromagnetic switch to control the energization of heating element 15. The electric discharge devices 17 and 19 are connected in the same manner as shown in Fig. 1 of the drawing and they jointly control the energization of actuating coil 101 which requires only a relatively small current to energize it. I provide a phase-shifting device 109 which is substantially the same as phase-shifting device 45 hereinbefore described in connection with Fig. 1 of the drawing, with the exception that it includes a reactor coil 111 in place of reactor coil 57, which need not necessarily be adjustable. The reason for this is that it is only necessary to completely block the passage of current through the two electric discharge tubes 17 and 19 instead of varying their electrical conductivity, as was necessary in the system shown in Fig. 1 of the drawing. In all other respects, the phase-shifting device 109 is similar to and the counterpart of phase-shifting device 45.

Since it is desired to obtain a temperature cycle including a short time peak temperature and then a lower maintained temperature (as well as certain other temperature cycles), I provide, in addition to the thermal switch 75, a second thermal switch 113. Thermal switch 75 includes an auxiliary heater element 91 connected as described below to make it a single cycle thermal switch, while thermal switch 113 does not include such an auxiliary heater, but in all respects other than the auxiliary heater and its circuits it is the same as switch 75. The circuit of auxiliary heater 91 for switch 75 extends from energizing conductor 39 through heater 91, stationary contacts 72 and cooperating movable contact 74 movable with and suitably insulated from arm 83 of switch 75, to the upper terminal of primary transformer coil 47.

However, whereas thermal switch 75 is designed and adjusted to close its circuit at a predetermined peak temperature, thermal switch 113 is designed and adjusted to cause engagement of its cooperating contacts at a lower temperature, which may be on the order of 300°, but since switch 75 includes an adjustable contact member 87, it is possible to vary the operating temperature thereof over a relatively wide range. Thermal switch 113 is connected in series circuit relation with thermal switch 75. A manually-actuable switch 115 is connected in parallel-circuit relation with thermal switch 75 and a second manually-actuable switch 117 is connected in parallel-circuit relation with thermal switch 113. This permits of enabling or disabling the respective thermal switches 75 and 113.

The system illustrated in Fig. 2 of the drawing permits of selectively obtaining, at the will of an operator, any one of three different kinds of temperature cycles in the cooking chamber 13. Thus, if both switches 115 and 117 are in their open positions, and if the system be energized, as was hereinbefore set forth in describing the operation of the system shown in Fig. 1 of the drawing and the actuating coil of contactor 99 is energized, causing the operation thereof to its closed position, the heating element 15 will be energized, whereby the temperature in the cooking chamber will be raised and will follow substantially the same curve as indicated by curve 95 in Fig. 6 of the drawing. Since both thermal switches 75 and 113 are initially open, the phase-shifting device 109 is deenergized and the electric discharge devices 17 and 19 are fully conductive, and normal current is traversing heating element 15 continuously. Therefore, a predetermined maximum average current is traversing the heating element to raise the temperature of any material located in cooking chamber 13.

As soon as the temperature of thermal switch 113 reaches its operating value, which, as noted above, may be on the order of 300° F., it will cause engagement of its contact members, but since it is in series circuit with thermal switch 75, no other action of the system will result. The temperature in the oven chamber will, therefore, continue to rise until it reaches the predetermined peak temperature of, say, 525°, at which temperature thermal switch 75 will cause engagement of its contact members thereby energizing the primary coil of the first transformer of phase-shifting device 109. The design and construction of phase-shifting device 109 is such that when it is energized, it will cause a complete loss of conductivity of electric discharge devices 17 and 19, whereby coil 101 of contactor 99 is deenergized and heating element 15 is also deenergized. When switch 75 closes, auxiliary contact members 72 and 74 also engage, whereby auxiliary heater or lock-in coil 91 is energized through the circuit previously traced.

The temperature will now drop gradually following curve 119, that is, the temperature will drop faster than before, since there is no input of electric energy into heating element 15, as was the case when the same was directly controlled by electric discharge devices 17 and 19, as in the system shown in Fig. 1 of the drawing. The lock-in means including coil 91 associated with thermal switch 75 insures that this thermal switch will remain in its closed position irrespective of temperature drop thereof within predetermined limits, but when the temperature of thermal switch 113 reaches, say, 300° F., it will cause disengagement of its contact members, whereby phase-shifting device 109 is deenergized. This results in electric discharge devices 17 and 19 becoming fully conductive again, reenergizing actuating coil 101, whereby heating element 15 is reenergized. The temperature in cooking chamber 13 will, therefore, again rise until thermal switch 113 is actuated to disengage its contact members when the temperature will again drop, which operation continues to obtain a temperature cycle indicated by the full saw tooth line 121 in Fig. 6 of the drawing, whereby a substantially constant average value is obtained. The thermal switch 113 is therefore a plural cycle thermal switch.

The system shown in Fig. 2 of the drawing, therefore, provides means for obtaining substantially the same initial average current value per unit of time in the cooking chamber 13 as is the case for the system of Fig. 1 of the drawing. Whereas, however, the average value of the current per unit of time when using the system shown in Fig. 1 of the drawing is continuous, although lower, when the electric discharge devices are partially conductive, the current traversing heating element 15 is intermittently completely interrupted in the system of Fig. 2 of the drawing, but the average current value per unit of time is substantially the same so that the same type of temperature cycle can be obtained.

If an operator desires to obtain a peak temperature and then a gradual and continuous decrease in the temperature down to substantially room temperature, it is only necessary to initially close switch 117 to thereby render ineffective or to disable thermal switch 113. The system will, therefore, be controlled by thermal switch 75 which, as has already been stated, remains open until the predetermined peak temperature has been reached, when it closes to energize the phase-shifting device 109 which is effective to render the electric discharge devices fully non-conductive. In other words, the heating element 15 is energized only until the desired peak temperature is obtained, after which it is completely deenergized.

If the operator wishes to obtain a lower maintained temperature, he need only close switch 115, leaving switch 117 open. This results in substantially the same operation as was hereinbefore set forth for the system shown in Fig. 1 of the drawing when switch 93 was closed, although the result is obtained in a slightly different manner. That is, instead of permitting a lower root-mean-square value of current to traverse the electric discharge devices and the heating element 15, as would be the case in the system shown in Fig. 1 of the drawing, the electric discharge devices of Fig. 2 are now made either fully conductive or fully non-conductive in sequence, so that, while the full value of current traverses the heating element 15, the circuit thereof is periodically interrupted by the operation of thermal switch 113.

The systems shown in Figs. 1 and 2 of the drawing show more particularly electric heating elements, but it is possible to apply this system of control to a gas range and I have illustrated such a system in Fig. 3 of the drawing. The cooking chamber 13 may be heated by a gas burner 123 which is shown as being located outside of the oven chamber 13, but I desire that this be interpreted generally only, as any desired design and construction of fuel-heated range oven and source of heat may be used. An electromagnetically actuated gas valve 125 is provided whose position is controlled by an electromagnet 127 including an actuating coil 129, and a core member 131 energized thereby, and connected through suitable linkage with gas valve 125. I have indicated a supply pipe 133 having associated therewith a pilot jet 135, the supply to which is connected to pipe 133 ahead of valve 125. In all other respects, the system illustrated in Fig. 3 of the drawing is identical with the system shown in Fig. 2 of the drawing, and its operation is the same. That is, it includes a pair of electric discharge devices which are either fully conductive or fully non-conductive, which electric discharge devices control the energization of the actuating coil 129 of the electromagnetically controlled gas valve 125. The operation is the same as that just hereinbefore described for the electrically heated oven 11 of Fig. 2 of the drawing, and it is possible for an operator to selectively obtain any one of three different cycles of temperature in the oven chamber 13 in the same manner as was described hereinbefore in connection with Fig. 2 of the drawing.

The system embodying my invention thus provides a relatively simple and efficient method of control for the oven of a range in which the heat source is either an electric heating element or gas heat, and in which it is possible to obtain a temperature cycle which has been found to be best in the preparation of certain kinds of foods while at the same time allowing of obtaining other equally useful temperature cycles.

Various other modifications may be made in the system embodying my invention without departing from the spirit and scope thereof and I desire therefore that only such limitations shall be placed thereon as are imposed by the prior art or are set forth in the appended claims.

I claim as my invention:

1. In a cooking appliance including a cooking chamber and a source of heat therefor, means to control the source of heat to obtain a short-time peak temperature in the cooking chamber and then a sustained lower average temperature therein, said control means including an electric discharge device to cause said heat source to supply a predetermined average amount of heat per unit of time to the cooking chamber and a thermostatically-controlled phase-shifting device electrically connected to the electric discharge device and effective at a predetermined peak temperature in the cooking chamber to cause the electric discharge device to reduce the average amount of heat per unit of time supplied by the source of heat to the cooking chamber.

2. In a cooking appliance including a cooking chamber and a heating means therefor, means to control the heating means to obtain a short-time peak temperature and thereafter a lower maintained average temperature in the cooking chamber, said means including an electric discharge device to control the energization of the heating means, a phase-shifting device electrically connected to the electric discharge device and a thermostatic member responsive to chamber temperature for controlling the energization of the phase-shifting device and effective to cause energization of the phase-shifting device at a predetermined peak temperature to thereby reduce the average current value to thereafter maintain a lower predetermined temperature in the cooking chamber.

3. In a cooking appliance including a cooking chamber and a heating means therefor, means to control the heating means to obtain a short-time peak temperature and then a lower average maintained temperature in the cooking chamber, said means comprising an electric discharge device to control the energization of the heating means, an initially deenergized phase-shifting device electrically connected to the electric discharge device to permit the passage therethrough of a predetermined maximum average current value, and a thermally-actuable device responsive to chamber temperature for controlling the electric discharge device to reduce the average current value in a given period of time to thereby maintain a lower average temperature in the cooking chamber.

4. In a cooking appliance including a cooking chamber and a source of heat therefor, means to control the source of heat to obtain a short-time peak temperature in the cooking chamber and then a sustained lower average temperature therein, said control means including an initially fully-conductive electric discharge device to cause said heat source to supply a maximum average amount of heat per unit of time to the cooking chamber and a thermostatically-controlled phase-shifting device electrically connected to the electric discharge device and effective at a predetermined peak temperature value in the cooking chamber to cause operation of the electric discharge device to reduce the average amount of heat per unit of time supplied by the source of heat to the cooking chamber to maintain a lower average temperature therein.

5. In a cooking appliance including a cooking chamber and a source of heat therefor, means to control the source of heat to obtain a short-time peak temperature and then a sustained lower average temperature in the cooking chamber, said control means including an electric discharge device to cause said heat source to supply a predetermined average amount of heat per unit of time, a phase-shifting device electrically connected to the electric discharge device and an initially open thermostatic switch responsive to chamber temperature controlling the energization of the phase-shifting device and effective at a predetermined peak temperature in the cooking chamber to effect energization of the phase-shifting device to cause the electric discharge device to control the source of heat to supply a lower average amount of heat per unit of time to the cooking chamber and to maintain the same thereafter.

6. Means as set forth in claim 5 and including locking-in means for the thermostatic switch to ensure its remaining closed irrespective of predetermined reductions in the temperature of the cooking chamber.

7. Means as set forth in claim 5 and including locking-in means for the thermostatic switch comprising an auxiliary heating resistor controlled by the thermostatic switch to cause the switch to remain closed irrespective of a predetermined temperature reduction in the cooking chamber.

8. In a cooking appliance including a cooking chamber and a source of heat therefor, means to control the source of heat to obtain a short-time peak temperature and then a sustained average lower temperature in the cooking chamber, said control means comprising two oppositely and parallel-connected grid glow tubes directly controlling the energization of the source of heat, an initially deenergized phase-shifting device electrically connected to the grid glow tubes, and a thermal switch responsive to chamber temperature controlling the energization of the phase-shifting device and effective at a predetermined peak temperature in the cooking chamber to cause energization of the phase-shifting device to vary the conductivity of the grid glow tubes to cause them to be conductive during a predetermined portion only of each half wave of electric energy applied thereto to maintain a lower temperature in the cooking chamber.

9. Means as set forth in claim 8 in which the phase-shifting device includes an adjustable reactor to vary the conductive time of the grid glow tubes and thereby the lower maintained temperature in the cooking chamber.

10. Means as set forth in claim 8 in which the phase-shifting device includes an adjustable reactor to vary the conductive time of the grid glow tubes and thereby the lower maintained temperature in the cooking chamber and in which the thermal switch is adjustable to vary the peak temperature value in the cooking chamber.

11. In a cooking appliance including a cooking chamber and a source of heat therefor, means to control the source of heat to obtain a short-time peak temperature and then a lower maintained temperature in the cooking chamber, said means comprising an electromagnetic device to control the source of heat, a pair of grid glow tubes controlling the energization of the electromagnetic device, a phase-shifting device for varying the conductivity of the grid glow tubes and a pair of series-connected thermal switches responsive to chamber temperature controlling the energization of the phase-shifting device, said thermal switches being operative respectively at the peak temperature and the lower maintained temperature.

12. Means as set forth in claim 11 in which the peak temperature switch is initially open and remains closed after its operation to closed position irrespective of any drop in temperature of the cooking chamber.

13. In a cooking appliance including a cooking chamber and a source of heat therefor, means to control the source of heat to obtain a short-time peak temperature and then a lower maintained temperature in the cooking chamber, said means comprising an electromagnetic device to control the source of heat, a pair of grid glow tubes controlling the energization of the electromagnetic device, a phase-shifting device for varying the conductivity of the grid glow tubes and a pair of series-connected thermal switches responsive to chamber temperature for controlling the energization of the phase-shifting device, both thermal switches being initially open, one thermal switch closing at the lower maintained temperature and the second thermal switch closing at the peak temperature, and thermo-electric means associated with and controlled by the second thermal switch to maintain it in closed position irrespective of any reduction in chamber temperature.

14. Means as set forth in claim 13 in which the thermo-electric means comprises an auxiliary heating element in series-circuit relation with the thermal switch.

15. In a cooking appliance including a cooking chamber and a heating means therefor, means to control the heating means to obtain selectively any one of a plurality of temperature cycles in the cooking chamber, said means including an electric discharge device to cause said heating means to supply a predetermined average amount of heat to the cooking chamber per unit of time, a phase-shifting device electrically connected to the electric discharge device to control the conductivity thereof, a thermal switch responsive to chamber temperature and controlling the energization of the phase-shifting device, and a manually actuable switch connected in parallel with the thermal switch, whereby when the manually-actuable switch is open the chamber temperature is raised to a predetermined short-time peak temperature and is then maintained at a lower average temperature and when the manually-actuable switch is closed the chamber temperature is maintained at a predetermined average value.

16. In a cooking appliance including a cooking chamber and a source of heat therefor, means to control the source of heat to obtain selectively and at the will of an operator any one of a plurality of cycles, said control means comprising an electromagnetic device to control the source of heat, an electric discharge device to control the energization of the electromagnetic device, a phase-shifting device electrically connected to the electric discharge device, a first thermal switch and a second thermal switch connected in series circuit with each other and jointly controlling the energization of the phase-shifting device, and manually-actuable switches respectively connected in parallel with the two thermal switches, whereby when both manually-actuable switches are open a short-time peak temperature and then a lower maintained temperature are obtained in the cooking chamber, when the manually-actuable switch associated with the first thermal switch alone is closed, a short-time peak temperature and then a gradually decreasing temperature are obtained, and when the manually actuable switch associated with the second thermal switch alone is closed a maintained average temperature is obtained.

17. Means as set forth in claim 2 and including a manually-actuable means for rendering ineffective the thermostatic member whereby to obtain only the lower maintained temperature in the cooking chamber.

18. Means as set forth in claim 5 and including a manually-actuable switch for short-circuiting the thermostatic switch whereby to control the source of heat to supply only the lower average amount of heat to the cooking chamber.

DEWEY D. KNOWLES.